April 4, 1939. F. W. SCHMIDT 2,153,524
METHOD OF MAKING RATCHET BARS
Filed March 21, 1936 2 Sheets-Sheet 1
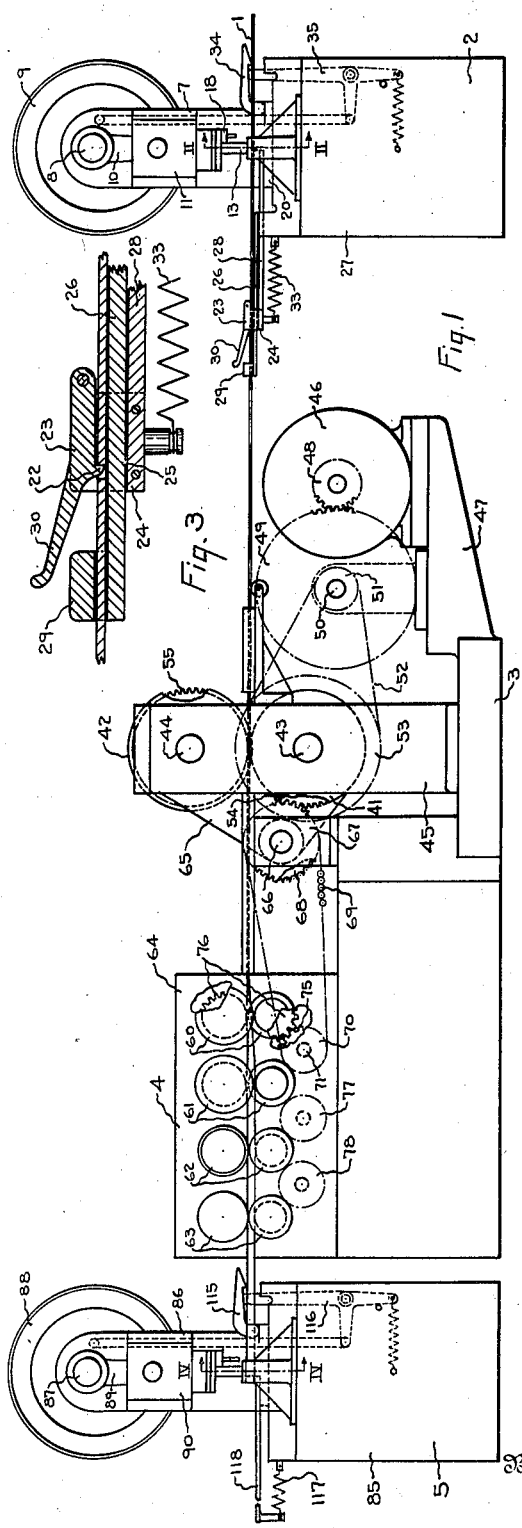
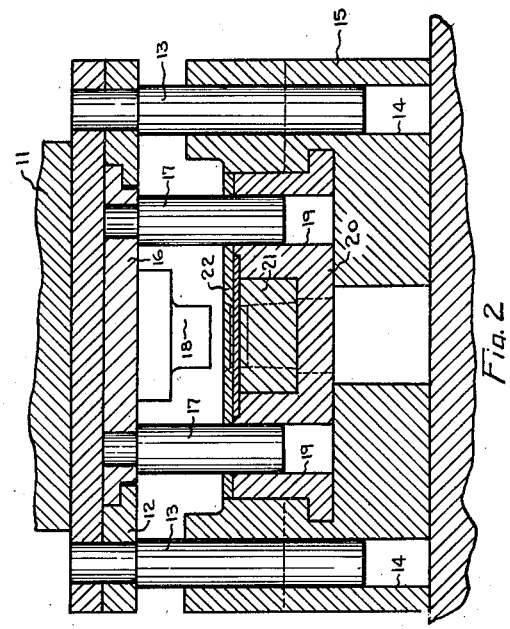
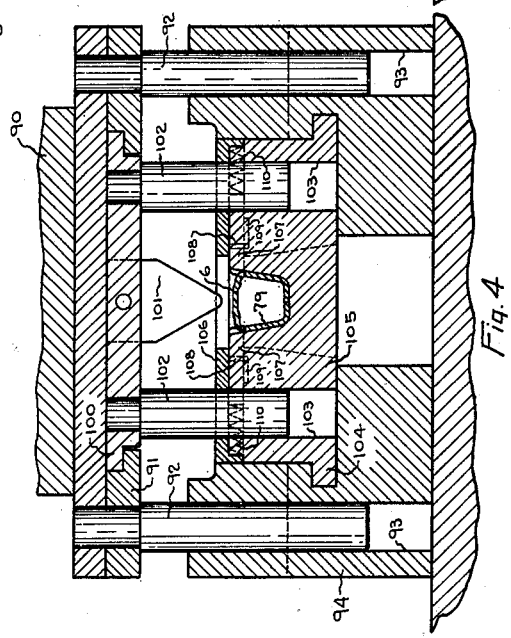
Inventor
Frank W. Schmidt
By Bearman + Langford
Attorney April 4, 1939.  F. W. SCHMIDT  2,153,524
METHOD OF MAKING RATCHET BARS
Filed March 21, 1936   2 Sheets-Sheet 2

Inventor
Frank W. Schmidt
By Beaman & Langford
Attorney

Patented Apr. 4, 1939

2,153,524

UNITED STATES PATENT OFFICE 2,153,524

METHOD OF MAKING RATCHET BARS

Frank W. Schmidt, Jackson, Mich., assignor to Ryerson & Haynes, Inc., Jackson, Mich., a corporation of Michigan Application March 21, 1936, Serial No. 70,071

7 Claims. (Cl. 153—2)

This invention relates to the making of shafts or supporting columns for ratchet jacks and more particularly to a method of making shafts or supporting columns for bumper ratchet jacks of the character disclosed in my copending application Serial No. 27,851 filed June 22, 1935, Patent No. 2,041,376, granted May 19, 1936.

The supporting column which is made according to the present invention comprises a tubular construction having ratchet teeth coined on one side thereof. In its preferred form the supportting column is trapezoidal in cross-section having the ratchet teeth on the longer of the two parallel sides. In manufacture the teeth are coined into flat continuous strip stock and the column is then given its final form by passing the stock through a series of forming rollers.

A feature of the invention is the cutting of the column as it comes from the forming machine into relatively short lengths comprising the separate supporting columns. The tubular column cannot be sheared off as such an operation would crush the section adjacent the cut. Crushing is eliminated by providing a series of transverse slots by punching out narrow strips of the material, spaced apart a distance equal to the length of a finished column, which comprises an entire width of the top or overhanging portion of the continuous column when it is in a horizontal position as it comes from the forming machine. A wedge shaped shearing blade is then successively inserted in the slots and actuated to shear off the sides and bottoms of the column thus parting from the continuous column, finished columns. In practice the slots are placed in the strip stock as the first step, just before the ratchet teeth are coined and the parting is of course the last step.

An object of the invention thus is to provide a method for forming ratchet jack supporting columns which comprises coining ratchet teeth in flat stock and then rolling the stock into a closed tubular bar having the teeth on one side thereof.

Another object of the invention is to provide a method of cutting a member of irregular cross-section having an overhanging portion which comprises punching out the overhanging section and shearing off the remaining portion.

Figure 5:
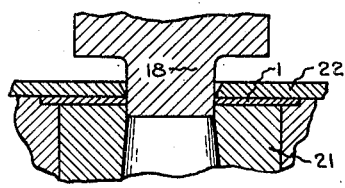
Figure 7:
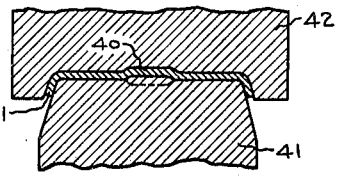
Figure 6:
Figure 8:
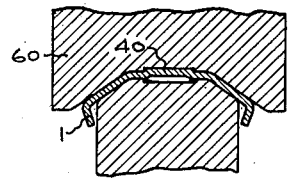
Figure 9:
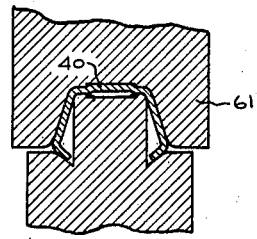
Figure 10:
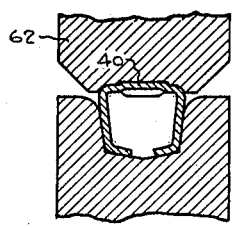
Figure 11:
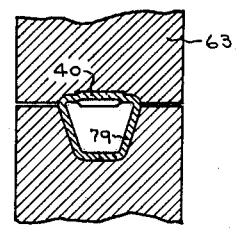
Figure 13:
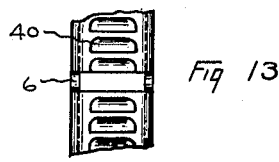
Figure 12:
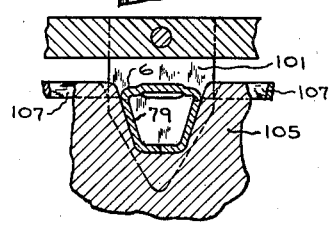

These and other objects will be apparent from the following specification when taken with the accompanying drawings in which:

Fig. 1 is an elevation of the machine used to form and cut off supporting columns, Fig. 2 is a section on the line II—II of Fig. 1, Fig. 3 is an enlarged detail of a portion of Fig. 1, Fig. 4 is a section on the line IV—IV of Fig. 1 with the parting die moved to central position, Fig. 5 is a partial sectional detail of the punch and die disclosing the same in operation, Fig. 6 is a section of the strip stock having the punching operation performed, Fig. 7 is a partial section of the coining rolls in operation, Figs. 8, 9 and 10 are partial sections of additional forming rolls in operation, Fig. 11 is a partial section of the last forming roll for closing the tubular bar into its finished form, Fig. 12 is a fragmentary detail of the parting mechanism, and Fig. 13 is a portion of the finished tubular bar illustrating the location of the slot punched out to assist in the parting operation.

Referring particularly to the drawings the forming machine operates on continuous strip stock 1 and comprises broadly punching mechanism 2, coining mechanism 3, forming mechanism 4 and parting mechanism 5. The punching mechanism 2 and the parting mechanism 5 are of the flying shear type and the coining mechanism 3 and the forming mechanism 4 comprise driven rolls.

The continuous strip stock 1 is fed into the machine from the right as viewed in Fig. 1, from a roll or any suitable source. The first step in operation is to punch out a transverse slot 6 as shown in detail in Figs. 5 and 6 from the center of the stock 1. The punching mechanism 2 for this purpose may take the form of any known or suitable flying shear punch press and as shown in Figs. 1 and 2 has a C-frame 7 in which is mounted a crank shaft having a crank 8 and a fly wheel 9. A usual connecting rod 10 driven by the crank 8 carries a ram assembly 11. The ram assembly 11 includes a slideway 12, see Fig. 2, and is guided for vertical reciprocation by plungers 13 acting in bores 14 in a frame 15. A slide 16 mounted for horizontal reciprocation in the slideway 12 and vertically reciprocable with the ram assembly 11 has mounted thereon a punch 18. The slide 16 is guided in its vertical reciprocation with the ram assembly 11 by plungers 17 acting in bores 19 in a sliding bolster plate 20. A die 21 and a stripper plate 22' for coacting with the punch 18 are mounted on the sliding bolster plate 20. It will thus be obvious that as the entire mechanism is operated to punch a slot 6 in the stock 11 the ram assembly 11 together with the punch 18 will move vertically while at the same time the punch 18 together with its die 21 and associated structure may move horizontally with the stock 1.

In order to move the sliding bolster plate 20, the die 21 and the punch 18 with the stock 1 at the time the slot 6 is to be formed, a catch 22 mounted on a pivoted arm 23 is provided. The arm 23 is mounted on a bracket 24 having a slideway 25 for receiving a guiding bar 26 rigidly supported from the press base 27. A bar 28 connects the bracket 24 to the sliding bolster plate 20 for movement therewith. Mounted on the outer end of the guiding bar 26 is a knockout block 29 for camming up the inclined outer end 30 of the arm 23 to raise the catch 22 as the arm 23 is moved by the stock 1 to a predetermined position relative to the knockout block 29.

In operation, as the stock 1 passes through the punching mechanism 2, its front edge or a slot 6, depending on whether a piece of stock is just beginning or has started long enough to have at least one slot 6 punched, engages the catch 22, which normally is held in its extreme right position together with the punching die 21 and associated sliding mechanism by the spring 33 anchored to the bracket 24 and the press base 27. Then as the stock is fed into the machine or drawn therethrough by the coining mechanism 3 and the forming mechanism 4, the bracket 24 is moved to the left at stock moving speed, and moves with it, by means of the bar 28, the slide 16, the punch 18, the die 21 and their associated sliding structure, against the tension of the spring 33. This movement continues until a pivoted latch 34 carried by the sliding bolster plate 20 engages press tripping mechanism 35 to cause the ram assembly 11 to move downwardly to drive the punch 18 through the stock 1. As the stock and punch are moving at the same speed no difficulty is encountered. Upon the completion of the punching, the timing of the entire mechanism is such that the extension 30 of the arm 23 strikes the knockout block 29 releasing the catch 22 allowing it to be returned to its extreme right position by the spring 33 to initiate the next punching cycle upon its engagement with the next slot 6.

The stock 1 passes from the punching mechanism 2 to the coining mechanism 3 which, by means of the rolls 41 and 42 shown in Figs. 1 and 7, not only coins ratchet teeth 40, see Fig. 13, in the stock 1 but also turns down the edges of the stock to define the portions to constitute the bottom side of the finished bar, that is the side opposite the side having the ratchet teeth. The rolls 41 and 42 are mounted on shafts 43 and 44, respectively, which in turn are mounted in a frame 45.

Power for operating the rolls 41 and 42 and also the forming mechanism 4 is supplied by an electric motor 46 supported by a suitable base 47. The motor 46 through a gear 48 drives a gear 49 which through its shaft 50 drives a sprocket wheel 51. The sprocket wheel 51 drives a chain belt 52 which through a second sprocket 53, drives the shaft 43 of the roll 41. Gears 54 and 55 mounted on the shafts 43 and 44, respectively, synchronize the rotation of the rolls 41 and 42.

The partially formed stock 1 passes from the coining mechanism 3 to the forming mechanism 4 which comprises four pairs of rolls 60, 61, 62 and 63 acting on the stock 1 in the order named. Partial sections of the rolls 60, 61, 62 and 63 are shown in Figs. 8, 9, 10 and 11, respectively. The rolls 60, 61, 62 and 63 are mounted in a frame 64 and are driven, as will be described, from the gear 54 mounted on the shaft 43 of the coining mechanism 3.

A bracket 65 on the frame 45 supports a shaft 66 on which is mounted a gear 67 meshing with the gear 54. Also mounted on the shaft 66 is a sprocket wheel 68 driving a chain belt 69 engaging with a sprocket wheel 70 mounted on a shaft 71 adjacent the pair of rollers 60 in the frame 64. A gear 75 on the shaft 71 drives a pair of meshing gears 76 which drive the rolls 60 in synchronism. Pairs of gears like gears 76 drive rolls 61, 62 and 63 and are driven one from the other, respectively, by the gears 79, 77 and 78.

Reference to Fig. 8 illustrates the forming operation performed by the pair of rolls 60. The partially formed stock 1 fed into the pair of rolls 60 has had its outer edges turned down by the rollers 41 and 42. The rolls 60 complete the defining of the different sides of the finished pair by bending the stock at each side of the ratchet teeth 40. It will be obvious from inspection of Fig. 8 that the side of the finished bar including the ratchet teeth 40 is defined and the sides adjacent to said sides are defined. The rolls 61 and 62 as disclosed in Figs. 9 and 10 continue the forming initiated by the rolls 41 and 42 as disclosed in Fig. 7 and the rolls 60, as disclosed in Fig. 8. The rolls 63, as disclosed in Fig. 11 complete the forming operation by closing the portions which originally constituted the edges of the stock 1 to form a tubular bar 79.

The completed bar 79 passes from the forming mechanism 4 to the parting mechanism 5 which is generally the same as the punching mechanism 2.

The parting mechanism comprises a base 85 on which is mounted a usual C-frame 86 in which is mounted a crank shaft having a crank 87 and a fly wheel 88. The usual connecting rod 89 driven by the crank 87 carries a ram assembly 90. The ram assembly 90 includes a slide way 91, see Fig. 4, and is guided for vertical reciprocation by plungers 92 acting in bores 93 in the frame 94. A slide 100 mounted for horizontal reciprocation in the slide way 91 and vertically reciprocable with the ram assembly 90 has mounted thereon a parting punch 101. The slide 100 is guided in its vertical reciprocation with the ram assembly 90 by plungers 102 acting in bores 103 in a sliding bolster plate 104. A die 105 and a stripper plate 106 for coacting with the parting punch 101 are mounted on the sliding bolster plate 104. It will, thus, be obvious that as in the case of the corresponding structure of the punching mechanism 2, as the entire parting mechanism is operated to part the finished tubular bar 79, the ram assembly 90 together with the parting punch 101 will move vertically while at the same time the parting punch 101 together with its die 105 and associated structure may move horizontally with the finished bar 79.

As illustrated particularly in Figs. 12 and 13 the slot 6 extends entirely across the top surface of the finished bar 79 when in its horizontal position as it comes from its forming mechanism 4 and at the location of the slot, there are no overhanging portions of the tubular bar 79. After the finished tubular bar is fed from the forming mechanism 4 into the parting mechanism 5 a pair of fingers 107 guided by pins 108 in slots 109 and yieldably urged by springs 110 yieldably bear against the upper sides of the tubular bar 79 in such a manner that when the slot 6 moves opposite them, they are urged into the slot 6 and are carried by the same at the same speed as the tubular bar 79 is traveling. After the fingers 107, which are mounted on the sliding bolster plate 104, engage in the slot 6, the slide 100, the parting punch 101 and the die 105 are all moved together with the tubular bar 79. When the slot 6 reaches a position in the parting mechanism 5 substantially beneath the parting punch 101 a latch 115 pivoted on the sliding bolster plate 104 engages with the press tripping mechanism 116 to cause the ram assembly 90 to drive the parting punch 101 into the slot 6. The parting punch 101 is wedge shaped in configuration and accordingly as it enters the slot 6 it drives the pins 107 outwardly against the action of the springs 110 and continues downwardly to part the tubular bar 79 at the slot 6. It should be observed that as the fingers 107, which result in the parting punch 101 and its coacting die 105, moving at the speed of the tubular bar 79 so that a flying shear may be accomplished, variations in the length of the tubular bar between adjacent slots 6 will not hinder the proper entrance of the parting punch 101 into the slot 6 and that therefore regardless of such variations in length between the adjacent slots 6 as may be caused by lack of uniformity in the metal formed either as to hardless, thickness or other characteristics the parting punch 101 will always separate the tubular bar 79 at a slot 6. In order to return the sliding bolster plate 104 and its associated parting mechanism to its normal right hand position after a parting operation has been completed a spring 117 connected to a bar 118 affixed to the sliding bolster plate 104 and the base 85 is provided.

While particular flying shear mechanism has been disclosed for punching the slot 6 and parting the finished tubular bar 79 into predetermined lengths, no invention is claimed in these constructions and any suitable mechanism for performing the respective operations may be employed.

I claim:

1. The method of forming members of overhanging crushable cross-section which comprises feeding strip stock of continuous lengths, piercing the same at predetermined spaced intervals to remove a transverse portion which after the forming of the finished member would overhang, the spacing of each of the removed portions being determined by the spacing of each portion removed before it, subjecting the stock to forming operations to form a bar having the cross-section of the finished member, supporting said bar for shearing and successively inserting a wedge shaped shearing blade in the openings left by said removed portions to part the formed bar at each opening, each insertion of the wedge shaped shearing blade into a pierced opening being controlled by the position of the opening entered.

2. The method of forming tubular ratchet bars which comprises feeding strip stock of continuous length, piercing said stock at predetermined spaced intervals to provide a series of spaced transverse slots, coining ratchet teeth along the center of said stock, forming said stock into a tubular bar having the ratchet teeth along one side thereof, said slots extending across the side on which said teeth are disposed, the unpierced portion of said strip adjacent each of said openings extending between and connecting adjoining sections of said bar at opposite sides of each of said openings, supporting said bar for shearing and successively inserting a wedge shaped shearing tool in said slots to part the formed bar at each opening, whereby said tubular bar is sheared into a plurality of sections without crushing the same.

3. A machine for forming a metal conduit which comprises means for feeding a continuous strip of flat metal into the machine, means for successively piercing the strip to remove predetermined portions thereof, means for forming the pierced flat strip into a continuous length of conduit, the unpierced portion of said strip adjacent each of said openings extending between and connecting adjoining sections of said conduit at opposite sides of each of said openings, and means including a shearing tool for successive insertion in the pierced openings to part the conduit at each opening while maintaining the formed cross section of said conduit.

4. The method of forming tubular bars of predetermined length, which comprises feeding strip stock of continuous length, piercing the same at predetermined spaced intervals, subjecting said stock to a forming operation to form a continuous tubular bar, the unpierced portion of said strip adjacent each of said openings extending between and connecting adjoining sections of said bar at opposite sides of said opening, and successively inserting an internally acting shearing tool in each of said openings to part the formed tube at each opening, whereby said tubular bar is sheared into a plurality of sections without crushing the same.

5. The method of forming hollow tubular bars of predetermined length, which comprises feeding strip stock of continuous length, forming transverse slots in the same at spaced intervals, subjecting said stock to forming operations to form a continuous tubular bar, the unpierced portion of said strip adjacent each of said openings extending between and connecting the adjoining sections of said bar at opposite sides of each of said openings, supporting said formed bar against outward pressure and inserting a wedge-shaped shearing tool successively in said slots to part the formed tube at each slot, whereby said tubular bar is sheared into a plurality of sections without crushing the same.

6. The method of forming members of overhanging crushable cross-section, which comprises feeding strip stock of continuous length, piercing the same at predetermined spaced intervals to remove transverse portions which after the forming of the finished member would overhang, subjecting the stock to forming operations to form a bar having the cross-section of the finished member, the unpierced portion of said strip adjacent each of said openings extending between and connecting the adjoining sections of said bar at opposite sides of each of said openings, supporting said bar at its sides and the bottom, and successively inserting a wedge-shaped shearing blade in the openings left by said removed portions to part the formed bar at each opening, whereby said finished bar is sheared into a plurality of sections without crushing the same.

7. The method of forming tubular bars of predetermined length, which comprises feeding strip stock of continuous length, piercing the same at predetermined spaced intervals, subjecting said stock to forming operations to form a continuous tubular bar, the unpierced portion of said strip adjacent said openings extending between and connecting adjoining sections of said bar at opposite sides of said openings, and successively shearing the tubular bar at the pierced openings to provide a plurality of bars of predetermined length.

FRANK W. SCHMIDT.